United States Patent [19]
Masson et al.

[11] 3,720,229
[45] March 13, 1973

[54] VALVE ASSEMBLY

[75] Inventors: Narinder Masson, Jersey City; William John Korenicki, Linden; Walter Ludwig Lechner, New Providence, all of N.J.

[73] Assignee: Gamon-Camet Industries, Inc., Newark, N.J.

[22] Filed: May 10, 1971

[21] Appl. No.: 142,345

Related U.S. Application Data

[62] Division of Ser. No. 23,355, March 27, 1970, Pat. No. 3,677,084.

[52] U.S. Cl. ............... 137/527.8, 251/251, 251/280, 251/298
[51] Int. Cl. ..................... F16k 17/12, F16k 31/44
[58] Field of Search ...137/527.8, 527, 530; 251/228, 251/280, 298, 251, 252

[56] References Cited

UNITED STATES PATENTS

| | | | |
|---|---|---|---|
| 2,045,518 | 6/1936 | Chatfield | 137/527 |
| 2,748,788 | 6/1956 | Duckstein | 137/527 |
| 3,478,778 | 11/1969 | Curtiss | 137/530 |
| 1,699,085 | 1/1929 | Vera | 137/115 |
| 2,389,947 | 11/1945 | Allen | 29/157 |
| 1,725,428 | 8/1929 | Tilden | 137/527.8 |
| 3,182,951 | 5/1965 | Spencer | 251/280 |
| 3,616,814 | 11/1971 | Hendey | 137/527.8 |
| 3,074,429 | 1/1963 | Farrow | 137/527.8 |

*Primary Examiner*—Martin P. Schwadron
*Assistant Examiner*—David J. Zobkiw
*Attorney*—Lerner, David & Littenberg

[57] ABSTRACT

A valve assembly, for controlling fluid flow through a conduit having a valve seat therein through which flow to the outlet end of the conduit must pass, comprising: a valve member for sealing said valve seat, toggle action means mounting said valve member in said conduit for toggle action movement between a closed valve seat sealing position and an open valve seat non-obstructing fluid flow position and, guide means for positively guiding said valve member through its valve seat opening and closing movements. The guide means comprises cam follower means mounted on said valve member and stationary cam means cooperating with said cam follower means for guiding said valve member through its said valve seat opening and closing movements. The cam means comprises a generally vertically disposed ramp-like member including an initial vertical portion defining the fully closed position of said valve member and permitting limited vertical movement of said valve member while in its fully closed position.

19 Claims, 10 Drawing Figures

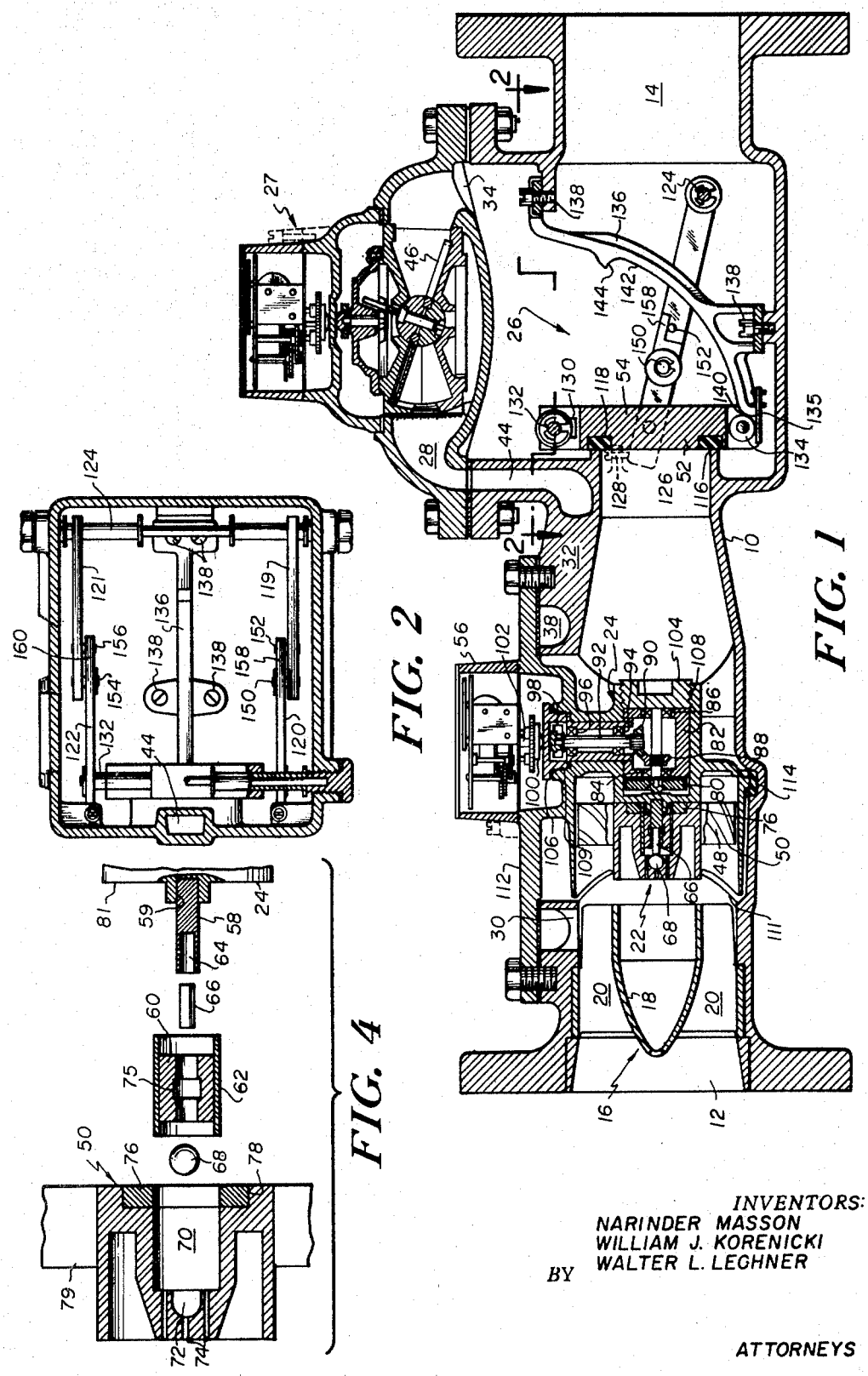

INVENTORS:
NARINDER MASSON
WILLIAM J. KORENICKI
WALTER L. LECHNER

BY

ATTORNEYS

VALVE ASSEMBLY

This is a division of application Ser. No. 23,355 filed Mar. 27, 1970 and now U.S. Pat. No. 3,677,084.

BACKGROUND OF THE INVENTION

Compound fluid meters are well known as evidenced by U.S. Pat. No. 934,504 to F. N. Connet granted Sept. 21, 1909, U.S. Pat. No. 2,425,720 to C. P. Bergman granted Aug. 19, 1947 and U.S. Pat. No. 3,203,238 to A. R. Whittaker et al. granted Aug. 31, 1965. Compound fluid meters are used when it is desired to accurately record the entire range of fluid flow rates through conduits, such as large service pipes, from the smallest stream to full demand. Thus, compound fluid meters generally comprise a high flow metering element disposed in a main conduit, a low flow metering element disposed in a bypass conduit, and changeover valve means for causing fluid flow past the high flow meter when the fluid pressure exceeds a predetermined high pressure and causing fluid flow past the low pressure flow meter when the fluid pressure is below the said predetermined high pressure. For example, the compound fluid meter of the Whittaker et al. patent comprises an impeller type high flow meter disposed in a main conduit, a nutating disc type low flow meter disposed in a bypass conduit, and changeover valve means for preventing fluid flow through the main conduit until a predetermined high pressure is reached. Fluid flow through the bypass conduit is permitted at all times.

Though the compound fluid meter art is well developed, there is of course always room for improvement in the provision of compound fluid meters which exhibit improved operating characteristics, are light weight, compact, require less and/or easier servicing, and are less expensive than present compound fluid meters.

SUMMARY OF THE INVENTION

According to the present invention, there is provided a compound fluid meter comprising a main conduit for receiving the fluid to be metered, a turbine type high flow metering device including an impeller disposed in the main conduit, changeover valve means disposed in the main conduit downstream of the impeller adapted to block fluid flow through the main conduit when the fluid pressure is below a predetermined high pressure and to permit fluid flow therethrough when the fluid pressure is equal to or greater than the said predetermined high pressure, a bypass conduit for removing fluid from the main conduit at a point upstream from the valve means and reintroducing it into the main conduit downstream from the valve means, low flow positive displacement metering means for metering fluid flow through the bypass conduit, a support member rotatably supporting the impeller in the main conduit, the support member having a free end extending toward the upstream end of the main conduit, a recess in said free end of said support member, a first thrust member disposed in and extending from said support member recess toward the upstream end of the main conduit, a second thrust member, and a recess in said impeller shaped to receive at least the free end of the support member with the first thrust member extending therefrom and the second thrust member disposed between the downstream end of the impeller recess and the first thrust member.

The invention further resides in the provision of lubricating holes extending through the impeller from the outside to the impeller recess for introducing the fluid being metered into the impeller recess to lubricate and cool the relatively rotating elements therein.

The invention still further resides in the fact that the turbine type metering device may comprise face polarized magnetic coupling means for coupling the impeller to an intermediate gear train and the intermediate gear train to the turbine meter's register box thereby permitting the intermediate gear train to be disposed in a fluid tight casing. Similar face polarized magnetic coupling means may be used for connecting the rotating element of the low flow metering means with its register box.

The invention still further resides in the fact that the changeover valve means comprises a valve member, toggle link means mounting said valve member in the main conduit, said valve member comprising a cam follower, and a cam for cooperating with said cam follower to guide the valve member through its opening and closing movements.

Still further features of the invention reside in the fact that the entire impeller assembly can be assembled employing press-fit techniques, the bearing thrust members can be case hardened and are easily replaceable, and the turbine type metering device can be removed for servicing without requiring removal of the main conduit from the line into which it is connected.

The general objects of this invention reside in the desire to provide a compound fluid meter which exhibits improved operating characteristics, is easier to manufacture, less expensive, more light weight, more compact, and easier to service.

BRIEF DESCRIPTION OF THE DRAWINGS

FIG. 1 is a cross-sectional view of a compound fluid meter in accordance with the present invention;

FIG. 2 is a cross-section of the compound fluid meter of FIG. 1 taken along the lines 2—2 of FIG. 1;

FIG. 4 is an exploded view of the turbine wheel assembly of FIG. 1;

DESCRIPTION OF THE PREFERRED EMBODIMENT

Figure 3:
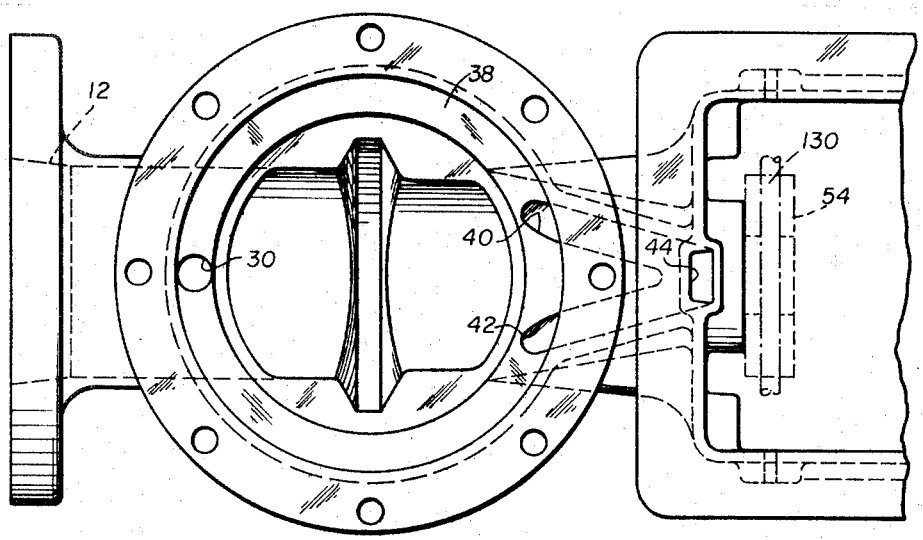
FIG. 3 is a plan view of a portion of the compound fluid meter of FIG. 1.

Referring to FIG. 1 which is a cross-sectional view of a compound fluid meter in accordance with the present invention, there is shown a main conduit 10 having an inlet end 12 and an outlet end 14. The general arrangement of the components within the main conduit 10 comprise an inlet guide assembly 16 positioned adjacent the inlet end 12 and consisting of a generally bullet-shaped central portion 18 and radially disposed guide vanes 20, an impeller assembly 22 disposed downstream of the inlet guide assembly 16, a fluid tight intermediate gear casing 24 disposed downstream of the impeller assembly 22, and a changeover valve assembly 26 disposed downstream of the intermediate gear casing 24. A somewhat tortuous bypass conduit 28 is connected to the main conduit 10 and comprises a bypass inlet 30 disposed upstream of the valve assembly 26, bypass passage means 32, and a bypass outlet 34 opening into the main conduit downstream of the valve assembly 26. A nutating disc type low flow fluid meter 27 is disposed in the bypass conduit 28 for metering fluid passing therethrough.

Figure 5:
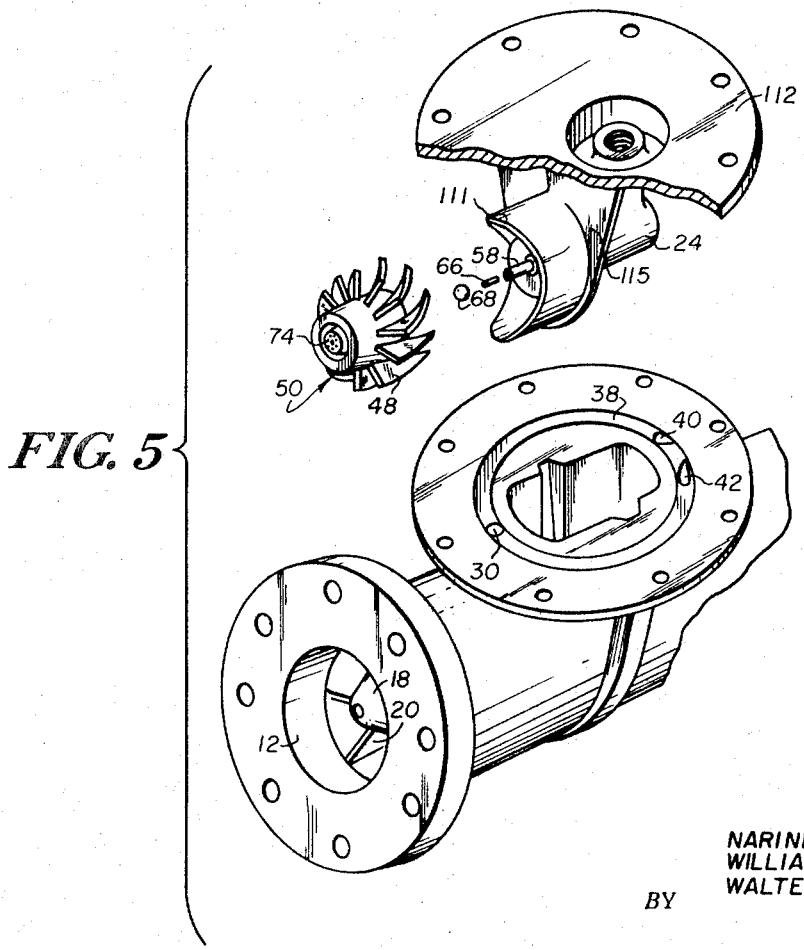
FIG. 5 is an exploded perspective view in part of the compound fluid meter of FIG. 1 showing the turbine housing unit and impeller out of the main conduit.

Before describing the details of the compound fluid meter, it is believed that a general discussion of the various flow conditions, particularly the flow paths, will be helpful toward providing a ready and complete understanding of the invention. Referring to FIGS. 1, 3 and 5, it can be seen that the inlet 30 leads to a circular grooved flow channel 38. A pair of outlets 40 and 42 connect channel 38 to an inlet channel 44 which leads to the nutating disc 46 of the nutating disc type meter 27. After passing by the disc 46, the fluid flows back into the main conduit 10 via the bypass outlet 34. The foregoing description describes fluid flow during low flow metering when the changeover valve assembly 26 is closed preventing direct flow through the main conduit 10.

When a predetermined high flow is reached, pressure differential causes the changeover valve assembly 26 to open permitting fluid flow directly through the main conduit 10 and past the vanes 48 of the impeller 50 of the turbine type metering device 22. Due to the quick action of the present changeover valve assembly 26, more fully described hereinafter, substantially all of the fluid flow immediately commences to pass through the main conduit 10 so that the turbine type metering device 22 approximates almost 100 percent accuracy and easily provides at least the minimum of 85 percent accuracy of registration required by American Water Works Association Standards dated July 25, 1947. Registration accuracy is defined therein as the ratio in percent of the water flow measured by a meter as compared to the actual amount of water flowing through the meter.

The initial fluid flow pattern differs somewhat from the described high volume and low volume flows. During start up, and assuming that initial fluid flow is at a low rate, the fluid, such as water, enters the inlet 12 and moves through the inlet guide assembly 20 past the impeller 50 causing rotation thereof due to the interaction of the fluid with the impeller vanes 48. However, almost immediately, main conduit 10 fills up with fluid from the upstream face 52 of the valve member 54 of the changeover valve assembly 26 to a position approximately adjacent the bypass inlet 30. Fluid flow then commences through the bypass conduit 32. Fluid flow past the impeller 50 ceases and rotational movement is no longer imparted to the impeller 50. This is of course due to the fact that the bypass inlet 30 is disposed upstream of the impeller vanes 48.

Many of the specific illustrated structural features of the present compound fluid meter are well known and will not be described in detail so as not to obscure the invention itself by the recitation of well known structural details. For example, many types of the nutating disc type meter assembly 27 are well known, as are a similar type of meter called an oscillating piston meter. Further, many structures of the register box 56 of the turbine type metering device 22 and the elements therein are well known. In addition, the use of flanges on the ends of the main conduit 10 and securing bolts in various positions are well known and will not be further alluded to so that the invention itself can be clearly described.

Referring to FIGS. 1 and 4, the turbine wheel assembly 22 comprises an axle or rod-like fixed support member 58 which is mounted in a recess 59 of the intermediate casing 24 and projects therefrom toward the inlet end 12 of main conduit 10. A bearing 60 disposed in a bearing sleeve 62 is mounted on the support member 58 and rotatably supports the impeller 50 thereon. A recess 64 is formed in the end of support member 58 and loosely receives a cylindrical thrust member or thrust pellet 66. A further thrust member or ball-shaped thrust bearing 68 is disposed between the thrust member 66 and the upstream end of a recess 70 in the impeller 50. The recess 70 comprises a generally semi-spherical front end 72 which matingly receives the ball-shaped thrust member 68. Many alternatives are possible. For example, the bearing sleeve 62 may be eliminated and the bearing 60 directly press fit into the impeller 50 for certain material combinations.

Lubricating channels or holes 74 in impeller 50 permit the fluid being metered to pass into the recess 70 and lubricate and cool the relatively rotating elements therein. Bearing 60 is provided with a groove 75 for improving the lubricating and cooling effects of the fluid.

Thrust members 66 and 68 function to absorb the thrust imposed on the impeller 50 by the fluid tending to force the impeller 50 into contact with the intermediate gear casing 24. The use of ball-shaped thrust bearings is well known as evidenced by U.S. Pat. No. 2,770,131 to R. C. Sparling granted Nov. 13, 1956. They function to minimize the tendency of an impeller to wobble or gyrate about its axis during rotation about an axle such as support member 58. Due to the size of the ball-shaped thrust member 68, it can readily be made of expensive wear resistant materials and/or case hardened. In accordance with the present invention, the second thrust member 66 in the form of a pellet or small cylinder is loosely disposed in recess 64 between the ball-shaped thrust member and the support member 58. Due to the size of the second thrust member 66, it can also be made of a relatively expensive wear resistant material and/or case hardened. Such a wear resistant material may preferably comprise tungsten carbide.

It has been found that the use of the second thrust member 66 results in improved impeller operating characteristics including more accurate performance and longer wear. Further, servicing or repair is simplified in that both thrust members 66 and 68 can be readily and easily replaced if necessary. It would of course be much more difficult to attempt to replace an entire support member 58. However, replacement of the support member 58 itself is facilitated in accordance with the present invention in that the support member 58 is mounted in the recess 59 by well known press-fit techniques so that it can be easily removed and replaced if this proves necessary.

The impeller assembly 22 further comprises an annular drive magnet 76 received in an annular recess 78 of the impeller 50. Magnet 76 is a permanent magnet and is preferably made of ceramic material. The sleeve 62 and support member 58 are preferably made of stainless steel. The impeller 50 is preferably made of a plastic material, such as polypropylene which has a specific gravity approximating that of water.

Referring more specifically to FIG. 4, the simplified assembly of the impeller assembly 22 will be described. The bearing 60 is mounted in the sleeve 62 by well known press-fit techniques. As noted previously, the support member 58 is mounted in the recess 59 of the intermediate gear casing 24 by similar press-fit techniques. In addition, the inlet guide assembly 16 is mounted in the inlet end 12 of the main conduit 10 by such press-fit techniques.

After the support member 58 is mounted in the recess 59 and the bearing 60 is mounted in the sleeve 62, the assembled bearing 60 and sleeve 62 are slid onto the support member 58. The thrust member or pellet 66 is then loosely placed in the support member recess 64. The ball-shaped thrust member 68 is positioned in the mating portion 72 of the recess 70 of the impeller 50 and the assembled impeller 50 and thrust member 68 slid over the sleeve 62 and outwardly extending thrust member 68 slid over the sleeve 62 and outwardly extending thrust member 66 and press-fit on the sleeve 62 to complete the impeller assembly. When so assembled, the impeller 50 will rotate with the sleeve 62 and bearing 60 about the support member 58 with the downstream side 79 of the impeller adjacent to but not in contact with the upstream face 81 of intermediate gear casing 24.

The retention of the impeller 50 on the support member 58 is aided by forces from the fluid flow and by the magnetic coupling of the annular magnet 76 with a further annular magnet 80 rotatably supported on a gear shaft 82 trunnioned in bearings 84 and 86 within intermediate gear basing 24.

Gear shaft 82 is coaxial with support member 58. Magnets 76 and 80 are axially or face polarized. This magnetic coupling of the magnets 76 and 80 causes the horizontal shaft 82 to rotate at the same speed that the impeller 50 rotates. A first bevel gear 88 is fixedly mounted on the shaft 82 and rotates therewith. First bevel gear 88 meshes with a second bevel gear 90 fixedly mounted on a vertical shaft 92 which is trunnioned in bearings 94 and 96. A driven annular magnet 98 is fixedly mounted on the upper end of the vertical shaft 92. The driven magnet 98 is also axially or face polarized and is magnetically coupled with a register box annular drive magnet 100 mounted on a vertical shaft 102 which is coaxial with the vertical shaft 92. Register box drive magnet 100 is thereby rotated at a speed proportional to the rotation of impeller 50 and through well known gearing provides a meter reading in the register box 56 which is proportional to the fluid flow passed impeller 50.

Though the use of magnetic coupling techniques is well known in the present art, the present construction of axially or face polarized pairs of annular magnets 76, 80 and 98, 100 has been found to be particularly desireable. As noted previously, the electromagnet coupling of annular magnets 76 and 80 aid in retaining impeller 50 on the support member 58. In addition, improved magnetic coupling is achieved. Most importantly, the use of the axially or face polarized magnets has made it possible to include the entire intermediate gear assembly within the fluid tight gear casing 24. Gear casing 24 is sealed on the downstream end by a fluid tight plug 104 sealing the opening 108, and a fluid tight plug 106 seals the upper opening 109. The sealing plug 106 also functions as a magnetic spacing element in determining the spacing between magnets 98 and 100. It will be noted that no shafts project out of intermediate gear casing 24 thus eliminating the need for stuffing boxes, elaborate seals, or the like.

Servicing of the vertical shaft assembly 92 and its cooperating elements can be easily accomplished by unscrewing of the threaded plug 106. Servicing of the horizontal shaft assembly 82 and its associated elements can be easily accomplished by unscrewing of the threaded plug 104. In fact, servicing of the entire turbine type metering device can be readily accomplished as will be noted with regard to FIG. 5. Further, all internal components can be removed and serviced without removing the meter from the piping system. This includes both metering elements and the valve elements.

It is believed to be clear from FIG. 5 that the entire turbine type metering assembly can be easily removed from main conduit 10 without requiring removal of the main conduit from the line it is connected in. Thus, the entire turbine type metering device is suspended from a cover member 112 which can be easily vertically removed from main conduit 10 by removal of the bolts (not shown) attaching it to main conduit 10. It can be seen in FIG. 1 that the register box 56 is mounted on cover 112. It will be noted that the turbine type metering device further comprises a cowl-like member 111 which receives the impeller 50 and through which the fluid to be metered is passed to and around intermediate gear casing 24 toward the valve member 54.

Assembly of the turbine type metering device with main conduit 10 is facilitated by the provision of a U-shaped groove 113 (FIG. 5) which receives a soft gasket 114 (FIG. 1) adapted to sealingly receive a vertical flange member 115 depending from cover 112. This simplified sealing means has proven to be effective, easy to service, and easy to manufacture and assemble.

Figure 8:
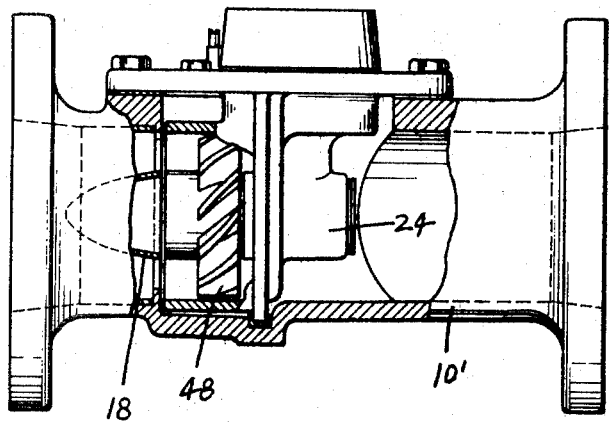
FIG. 8 is a side elevational view partly in cross section of an impeller type metering device in accordance with the invention.

Referring to FIG. 8, where like reference numerals refer to similar parts, it will be noted that the present turbine type metering device may be employed alone. Though the construction of the turbine type metering device is not changed, it will be appreciated that the construction of the main conduit 10' will differ from the construction of main conduit 10 in that accommodation for the low flow metering device, bypass conduit, etc. need not be made. With regard to the construction of the turbine type metering device in general, it can be clearly seen in FIG. 8 that the vanes 48 consist of helical blade members 48 formed in an overlapping manner. The overlapping helical blade design is preferred as it has been found to provide improved accuracy.

The changeover valve assembly 26 will initially be described with reference to FIGS. 1 and 2. A valve seat 116 is formed in main conduit 10 downstream from intermediate gear casing 24. All fluid flow directly through main conduit 10 must pass through valve seat 116. Valve member 54 comprises a valve sealing insert member 118 which seals valve seat 116 when valve member 54 is disposed in the fully closed position shown in FIG. 1. Insert member 118 is made of resilient material which aids in effecting a good seal.

Valve member 54 is mounted for toggle action movement as will be described. Such movement is provided for by two pairs of cooperating toggle links 119, 120 and 121, 122; stops 128 disposed above one end of each link 120 and 122; an elongated pin member 132 disposed near the top of valve member 54; and an elongated slot 130 which receives elongated pin member 132. It will be noted that links 119 and 121 are pivotally mounted at one end to shaft 124 and at their other ends to links 120 and 122 respectively. It will also be noted that links 120 and 122 are pivotally connected to pin 126 and extended beyond the valve member 54 in the upstream direction for engagement with the stops 128. As will be brought out more fully hereinafter, the present arrangement has resulted in more rapid action of the valve member 54.

Guide means in the form of a cam follower or roller 134 and a cam or ramp 136 are provided for guiding valve member 54 through its opening and closing positions. The cam follower 134 and cam 136 also provide positive stops for determining the valve fully opened and fully closed positions. The guide means have been found to be effective in insuring positive action of the changeover valve assembly 26 and more rapid opening and closing movements. In particular, it has been found that the closing movements of the valve member 54 are more rapid and precise when employing the guide means.

Ramp 136 is fixedly secured in main conduit 10 centrally of the valve member 54 by four screws 138. To remove the entire ramp assembly, the screws 138 can be removed and the ramp 136 also removed without removing main conduit 10 from the rest of the piping. The cam surface of ramp 136 includes a knee 140 which defines the valve member 54 fully closed position, a smooth guiding surface 142 for guiding the cam follower 134 through the opening and closing movements of the valve member 54, and an abutment 144 which defines the fully opened position of valve member 54. It will be noted that the knee 140 of the cam surface permits an initial slightly vertical movement of valve member 54 while it is maintained in its fully closed position. Such initial vertical movement is also accommodated by slot 130 and the cooperating elongated pin member 132. In fact, the cooperating slot 130 and pin 132 and the cooperating roller 134 and knee 140 act together in defining an initial path of vertical movement for valve member 54. Further, a valve roller rest 135 is provided to insure that the most desirable functioning relationship of ramp 136 and roller 134 will be obtained everytime the valve member 54 is brought to the fully closed position.

Figure 6:
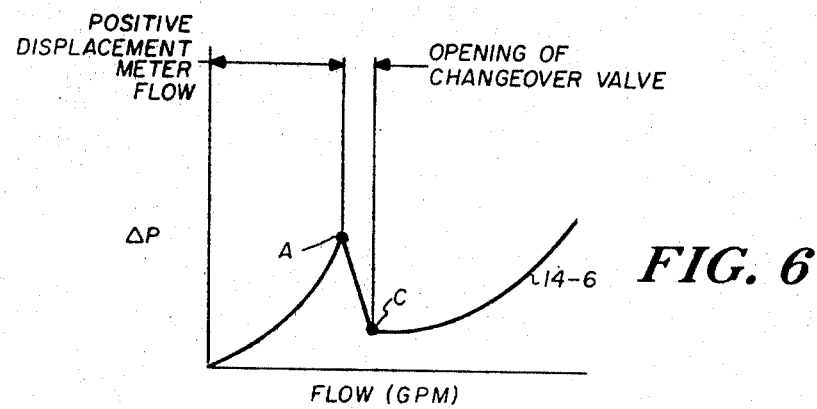
FIG. 6 is a flow diagram illustrating the functioning of the changeover valve.

A characteristic curve 146 illustrative of the fluid pressure (abscissa) against the upstream face 52 of valve member 54, which is similar to the pressure on nutating disc 46, versus fluid flows in gallons per minute (GPM) (ordinate) is shown in FIG. 6. The point A represents the desired flow at which the changeover valve assembly 26 will operate to permit fluid flow through main conduit 10 thereby actuating the high flow turbine type meter. The nutating disc type meter 27 measures flow at rates below the desired valve opening point and is very accurate within the range of flows that it is used to measure. The high flow turbine type meter is very accurate within the range of expected flows between the flow at the desired valve opening point and the full demand expected in the line. The pressure acting on valve member 54 increases until the predetermined flow rate (point A) is reached. Then, as the valve opens, the pressure rapidly drops off to the point C, where valve member 54 is in its fully open position, and then commences to rise with increasing flow.

Figure 7:
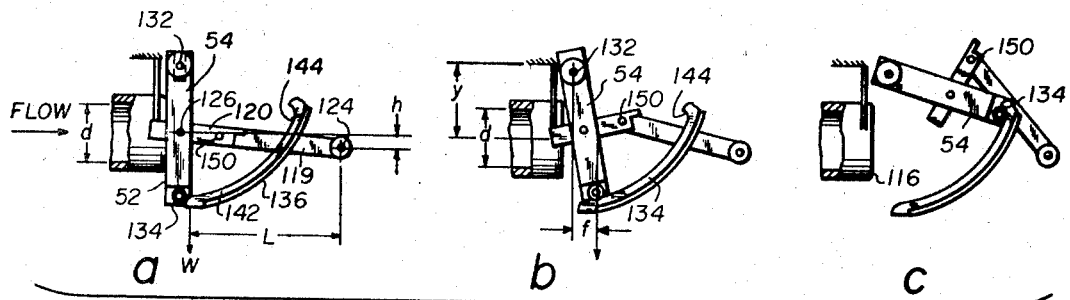
FIGS. 7a, 7b and 7c are schematic illustrations of different positions of the changeover valve assembly.

FIGS. 7a, 7b and 7c are schematic illustrations of the changeover valve assembly 26 in its fully closed position, an intermediate position, and its fully open position, respectively. When the valve member 54 is in the closed position, fluid pressure acting on the valve face 52 will develop a moment $(\Delta P)(\pi d^2/4)(h)$ tending to open the valve, where $h$ is the vertical distance between points 124 and 126 and $d$ is the diameter of valve seat 116.

The moment resisting the opening of valve member 54 is its weight $W$ times the distance $L$ from the point 124 to the point 126. When $\Delta P$ becomes sufficiently large (point A in FIG. 6), valve member 54 and links 119, 120 and 121, 122 will rotate slightly clockwise about point 124. The valve member 54 will lift vertically bringing cam follower 134 to the upper portion of the knee 140 of cam 136 and pin 132 to the lower portion of slot 132. Thus, initial vertical movement of valve member 54 while it is in its fully closed position is accommodated.

Upon further vertical movement of valve member 54, cam follower 134 will reach the top of the knee 140 and, simultaneously, links 120 and 122 will engage stops 128. Such engagement causes the links 120 and 122 to move counterclockwise about pivot point 150 thereby breaking the toggle action of the pairs of links 119, 120 and 121, 122. At this instant, the moment resisting opening of valve member 54 is $(W)(f)$, where $f$ represents the horizontal distance between the center of gravity of valve member 54 and pin 132. It will be appreciated that the distance $f$ is much less than the distance $L$. Further, the moment tending to move valve member 54 to its fully opened position is $(\Delta P)(\pi d^2/4)(y)$, where $y$ is the vertical distance between the center of valve seat 116 and pin 132. It will be appreciated that the distance $y$ is greater than the distance $h$. Thus, while the moment tending to move valve member 54 to its fully open position has increased, the moment tending to hold valve member 54 in its closed position has greatly decreased. Therefore, valve member 54 rapidly moves to its fully open position shown in FIG. 7c.

A reduction in fluid flow results in valve member 54 moving towards its fully closed position. Upon approaching its fully closed position, a reverse toggle action occurs and the valve member rapidly moves to its fully closed position.

The cam follower 134 and cam 136 guide valve member 54 at all times through its opening and closing movements. This insures the desired movement of valve member 54 and has provided increase reliability of performance. In addition, more rapid opening and closing has resulted.

Referring again to FIGS. 1 and 2, it will be noted that the pairs of links 119, 120 and 121, 122 are provided with stops 152 and 156, respectively. Further, the pivot 150 referred to in FIGS. 7a, 7b and 7c is provided by pivot pin 150 for links 119, 120 and by pivot pin 154 for links 121, 122. The stops 152 and 156 are engaged by extensions 158 and 160 of links 120 and 122 respectively to define the fully closed positions of the pairs of links respectively.

While the principles of the invention have been described in connection with specific apparatus, it is to be clearly understood that the description is made only by way of example and not intended as a limitation to the scope of the invention as set forth in the accompanying claims.

What is claimed is:

1. A valve assembly for controlling fluid flow through a conduit, said conduit having a valve seat therein through which fluid flow to the outlet end of the conduit must pass, said valve assembly comprising a valve member for sealing said valve seat, toggle action means mounting said valve member in said conduit for toggle action movement between a closed valve seat sealing position and an open valve seat non-obstructing fluid flow position and guide means for positively guiding said valve member through its valve seat opening and closing movements; wherein said guide means comprises cam follower means mounted on said valve member and stationary cam means cooperating with said cam follower means for guiding said valve member through its said valve seat opening and closing movements; wherein said cam means comprises a generally vertically disposed ramp-like member; and wherein said ramp-like member includes an initial vertical portion defining the fully closed position of said valve member and permitting limited vertical movement of said valve member while in its fully closed position.

2. An assembly according to claim 1, wherein said guide means comprises first and second abutment means defining the fully open and fully closed positions of said valve member.

3. An assembly according to claim 1, wherein said cam follower means comprises a roller rotatably mounted on said valve member.

4. An assembly according to claim 1, wherein said ramp-like member includes a final abutment portion defining the fully open position of said valve member.

5. An assembly according to claim 1, wherein said cam follower means comprises a roller rotatably mounted on said valve member in rolling contact with said ramp-like member.

6. An assembly according to claim 1, wherein said toggle action means includes a vertical slot in said valve member and a horizontal pin member which cooperates with said vertical slot to constrain said valve member to vertical movement only while said cam follower means is in engagement with said initial vertical portion of said ramp-like member.

7. An assembly according to claim 1, wherein said toggle action means includes a vertical slot in said valve member and a horizontal pin member which cooperates with said vertical slot to constrain said valve member to vertical movement only while said cam follower means is in engagement with said initial vertical portion of said ramp-like member.

8. A valve assembly for controlling fluid flow through a conduit, comprising a valve seat disposed in a generally vertical plane, a valve member for sealing said valve seat, and toggle action means mounting said valve member in said conduit for toggle action movement between a closed valve seat sealing position and an open valve seat non-obstructing fluid flow position, said toggle actions means including a first link pivotally connected to said valve member, a second link pivotally connected at one end to said first link at a position disposed below and downstream from the pivotal connection of said first link to said valve member, said second link being pivotally connected at its other end to said conduit at a position disposed below and downstream from the pivotal connection of said second link to said first link, said first and second links being axially aligned when said valve member is in its closed position, and a stop member disposed above said first link and positioned to engage said first link when said valve member is moved vertically a predetermined distance causing said first link to pivot about its pivotal connection to said second link in a counterclockwise direction.

9. An assembly according to claim 8, wherein a portion of said first link extends beyond said valve member in the upstream direction and said stop member is positioned to engage with said upstream extending portion.

10. An assembly according to claim 8, wherein one of said first and second links comprises an abutment and the other of said first and second links comprises a finger portion which engages said abutment when said valve member is in its fully closed position and the first and second links are axially aligned.

11. An assembly according to claim 8, wherein said valve member includes a vertical slot disposed above said pivotal connection of said valve member to said first link, and further comprising a horizontal pin member cooperating with said vertical slot to permit both initial vertical movement of the valve member while it is in its fully closed position and pivoting movement of the valve member about said horizontal pin member.

12. An assembly according to claim 11, further comprising guide means which cooperate with said horizontal pin member and vertical slot to constrain said valve member to vertical movement while in its fully closed position until said first link engages said stop member.

13. An assembly according to claim 12, wherein said guide means comprises cam follower means mounted on said valve member and cam means cooperating with said cam follower means for guiding said valve member through its valve seat opening and closing movements.

14. An assembly according to claim 13, wherein said cam follower means comprises a roller rotatably mounted on said valve member.

15. An assembly according to claim 13, wherein said cam means comprises a generally vertically disposed ramp-like member, and said ramp-like member includes an initial vertically disposed portion which cooperates with said cam follower means and said vertical slot and horizontal pin member to constrain said valve member to said vertical movement prior to said engagement of said first link with said stop member.

16. An assembly according to claim 15, wherein said ramp-like member comprises a final abutment portion which defines the fully open position of said valve member.

17. An assembly according to claim 15, wherein said toggle action means includes two pairs of said first and second links pivotally connected to said valve member one on each side of said ramp-like member.

18. An assembly according to claim 15, wherein said initial vertically disposed portion of said ramp-like member comprises a stop member for exactly determining the rest position of said cam follower means when said valve member is in the fully closed position.

19. An assembly according to claim 11, wherein said slot is directly vertically disposed above the point of pivotal connection of said first link to said valve member.

* * * * *